United States Patent
Tsuda et al.

(10) Patent No.: US 8,123,273 B2
(45) Date of Patent: Feb. 28, 2012

(54) SCREEN FOR MOTORCYCLE

(75) Inventors: Haruka Tsuda, Saitama (JP); Takefumi Okubo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 310 days.

(21) Appl. No.: 12/358,299

(22) Filed: Jan. 23, 2009

(65) Prior Publication Data

US 2009/0195011 A1   Aug. 6, 2009

(30) Foreign Application Priority Data

Feb. 5, 2008  (JP) ................................ 2008-024746
Sep. 16, 2008  (JP) ................................ 2008-236185

(51) Int. Cl.
 *B62J 17/00* (2006.01)
(52) U.S. Cl. ...... 296/78.1; 296/77.1; 296/91; 296/180.1
(58) Field of Classification Search .............. 296/77.1, 296/78.1, 180.1, 91, 96.21; *B62J 17/02*
See application file for complete search history.

(56) References Cited

U.S. PATENT DOCUMENTS

| | | | | |
|---|---|---|---|---|
| 3,971,452 A * | 7/1976 | Morelli | ................. | 296/180.1 |
| 4,066,291 A * | 1/1978 | Hickman | ................. | 296/78.1 |
| 4,326,728 A * | 4/1982 | Tatch | ................. | 280/288.2 |
| 4,331,358 A * | 5/1982 | Johnson et al. | ................. | 296/78.1 |
| 4,911,494 A * | 3/1990 | Imai et al. | ................. | 296/78.1 |
| 5,409,287 A * | 4/1995 | Suzuki | ................. | 296/180.1 |
| 5,857,727 A * | 1/1999 | Vetter | ................. | 296/78.1 |
| 6,231,104 B1* | 5/2001 | Roethel | ................. | 296/78.1 |
| 7,458,626 B1* | 12/2008 | Stadnyk | ................. | 296/78.1 |
| 2008/0111392 A1* | 5/2008 | Masuda et al. | ................. | 296/78.1 |
| 2009/0108620 A1* | 4/2009 | Matsuo et al. | ................. | 296/91 |

FOREIGN PATENT DOCUMENTS

| | | |
|---|---|---|
| AU | 84 122/82 A | 1/1983 |
| CN | 1279181 A | 1/2001 |
| EP | 1 063 158 A2 | 12/2000 |
| EP | 1291274 A2 | 3/2003 |
| JP | 2002-87355 A | 3/2002 |
| JP | 2002-104267 A | 4/2002 |
| JP | 2003-81160 A | 3/2003 |

* cited by examiner

*Primary Examiner* — Glenn Dayoan
*Assistant Examiner* — Pinel Romain
(74) *Attorney, Agent, or Firm* — Birch, Stewart, Kolasch & Birch, LLP

(57) ABSTRACT

A screen for a vehicle which allows air flow to flow appropriately along a rear face of a wind screen having an adjustable inclination angle. A baffle plate inclined toward the rear direction of a vehicle body is provided between a cowling which covers a front upper portion of the vehicle body and a movable wind screen. The inclination angle of the baffle plate can be adjusted so that air flow from between the cowling and the movable wind screen flows along a rear face of the movable wind screen.

12 Claims, 13 Drawing Sheets

SCREEN FOR MOTORCYCLE

CROSS-REFERENCE TO RELATED APPLICATIONS

The present application claims priority under 35 USC 119 to Japanese Patent Application No. 2008-024746 filed on Feb. 5, 2008 and Japanese Patent Application No. 2008-236185 filed on Sep. 16, 2008 the entire contents of which are hereby incorporated by reference.

FIELD OF THE INVENTION

A screen for a motorcycle which includes a wind screen having an adjustable inclination angle.

DESCRIPTION OF BACKGROUND ART

Motorcycle are known that include a movable wind screen having an adjustable height on a cowling which covers a front upper portion of a vehicle body. Some movable wind screens of this type have an inclination angle which is adjusted in an interlocked relationship with adjustment of the height. See, for example, Japanese Patent Laid-Open No. 2003-81160.

However, in the conventional configuration, if the wind screen is configured for adjustment to a higher position, at a higher position of the wind screen, the wind screen is spaced away from the cowling. In addition, the inclination angle thereof approaches the vertical direction. Although the air flow from between the cowling and the wind screen flows along the surface of the cowling, the probability occurs that the air flow may not sufficiently flow to the rear face of the wind screen. If the air flow does not sufficiently flow to the rear face of the wind screen, then the space between the wind screen and the driver is placed into a negative pressure state and the air flow is sucked toward the rear of the wind screen, resulting in a deterioration of the driving feeling of the driver.

SUMMARY AND OBJECTS OF THE INVENTION

It is an object of an embodiment of the present invention to provide a screen for a motorcycle which allows air flow to flow appropriately along a rear face of a wind screen having an adjustable inclination angle.

According to an embodiment of the present invention, there is provided a screen for a motorcycle which includes a cowling for covering a front upper portion of a vehicle body and a movable wind screen disposed in an inclined relationship toward the rear direction of the vehicle body above the cowling and mounted such that the inclination angle thereof can be adjusted. A baffle plate, inclined toward the rear direction of the vehicle body, is provided between the cowling and the movable wind screen. The inclination angle of the baffle plate can be adjusted so that air flow from between the cowling and the movable wind screen flows along a rear face of the movable wind screen.

In an embodiment of the present invention, since the baffle plate, inclined toward the rear direction of the vehicle body, is provided between the cowling and the movable wind screen and the inclination angle of the baffle plate can be adjusted so that air flow from between the cowling and the movable wind screen flows along the rear face of the movable wind screen, the air flow can be let flow appropriately along the rear face of the movable wind screen.

In the configuration described above, preferably the inclination angle of the baffle plate is set to a large angle when the inclination angle of the movable wind screen is large, but when the inclination angle of the movable wind screen is small, the inclination angle of the baffle plate is set to a small angle. With this configuration, the inclination angle of the baffle plate and the inclination angle of the movable wind screen can be made substantially equal to each other, and the air flow can flow along the rear face of the movable wind screen.

In the configuration described above, the screen for a motorcycle may be configured such that the baffle plate is connected to the movable wind screen, and a connection mechanism which varies the inclination angle of the baffle plate in response to the inclination angle of the movable wind screen is provided. With this configuration, since the connection mechanism which connects the baffle plate to the movable wind screen varies the inclination angle of the baffle plate in response to the inclination angle of the movable wind screen, a configuration for causing the baffle plate to interlock with the movable wind screen can be simplified.

Further, in the configuration described above, the baffle plate may be connected for sliding movement to the cowling while a state wherein a lower end thereof is positioned in the proximity of the surface of the cowling is kept so that the air flow flowing along the surface of the cowling flows toward the rear direction of the vehicle body along a front face of the baffle plate. With this configuration, the air flow flowing along the surface of the cowling can be introduced efficiently to the front face of the baffle plate.

Further, in the configuration described above, the connection mechanism may include a connection member connected to the baffle plate to vary the inclination angle of the baffle plate in response to the inclination angle of the movable wind screen, the connection member being disposed below the baffle plate. With this configuration, since the connection member is disposed below the baffle plate, the connection member does not disturb flow of the air flow from between the movable wind screen and the baffle plate. Therefore, the air flow can flow more smoothly along the front face of the baffle plate. Thus, a reduction in the air resistance and a reduction of the wind noise can be achieved.

In this instance, the connection member may include a guide arm extending along the forward and backward direction below the baffle plate, the guide arm being rocked upwardly and downwardly in response to movement of a stay connected to the movable wind screen such that the inclination angle of the baffle plate is varied by the upward or downward rocking motion of the guide arm. With this configuration, since the guide arm extending along the forward and backward direction below the baffle plate is rocked upwardly or downwardly to vary the inclination angle of the baffle plate, the guide arm does not disturb the air flow from between the movable wind screen and the baffle plate. Thus, the air flow can flow smoothly along the front face of the baffle plate.

In an embodiment of the present invention, the baffle plate inclined toward the rear direction of the vehicle body is provided between the cowling and the movable wind screen and the inclination angle of the baffle plate can be adjusted so that air flow from between the cowling and the movable wind screen flows along the rear face of the movable wind screen. Therefore, the air flow can permit an flow appropriately along the rear face of the movable wind screen.

Further, the inclination angle of the baffle plate is set to a large angle when the inclination angle of the movable wind screen is large, but when the inclination angle of the movable wind screen is small, the inclination angle of the baffle plate is set to a small angle. Therefore, the inclination angle of the baffle plate and the inclination angle of the movable wind screen can be made substantially equal to each other such that the air flow can be let flow along the rear face of the movable wind screen.

Further, the connection mechanism which connects the baffle plate to the movable wind screen varies the inclination angle of the baffle plate in response to the inclination angle of the movable wind screen. Therefore, a configuration for causing the baffle plate to interlock with the movable wind screen can be simplified.

Further, the baffle plate is connected for sliding movement to the cowling while a state wherein a lower end thereof is positioned in the proximity of the surface of the cowling is kept so that the air flow flowing along the surface of the cowling permits the flow toward the rear direction of the vehicle body along the front face of the baffle plate. Therefore, the air flow flowing along the surface of the cowling can be introduced efficiently to the front face of the baffle plate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following, embodiments of the present invention are described with reference to the accompanying drawings. It is to be noted that indications regarding the direction such as forward, backward, leftward, rightward, upward and downward directions are given in accordance with directions as viewed from the driver who drives the vehicle body.

Figure 1:
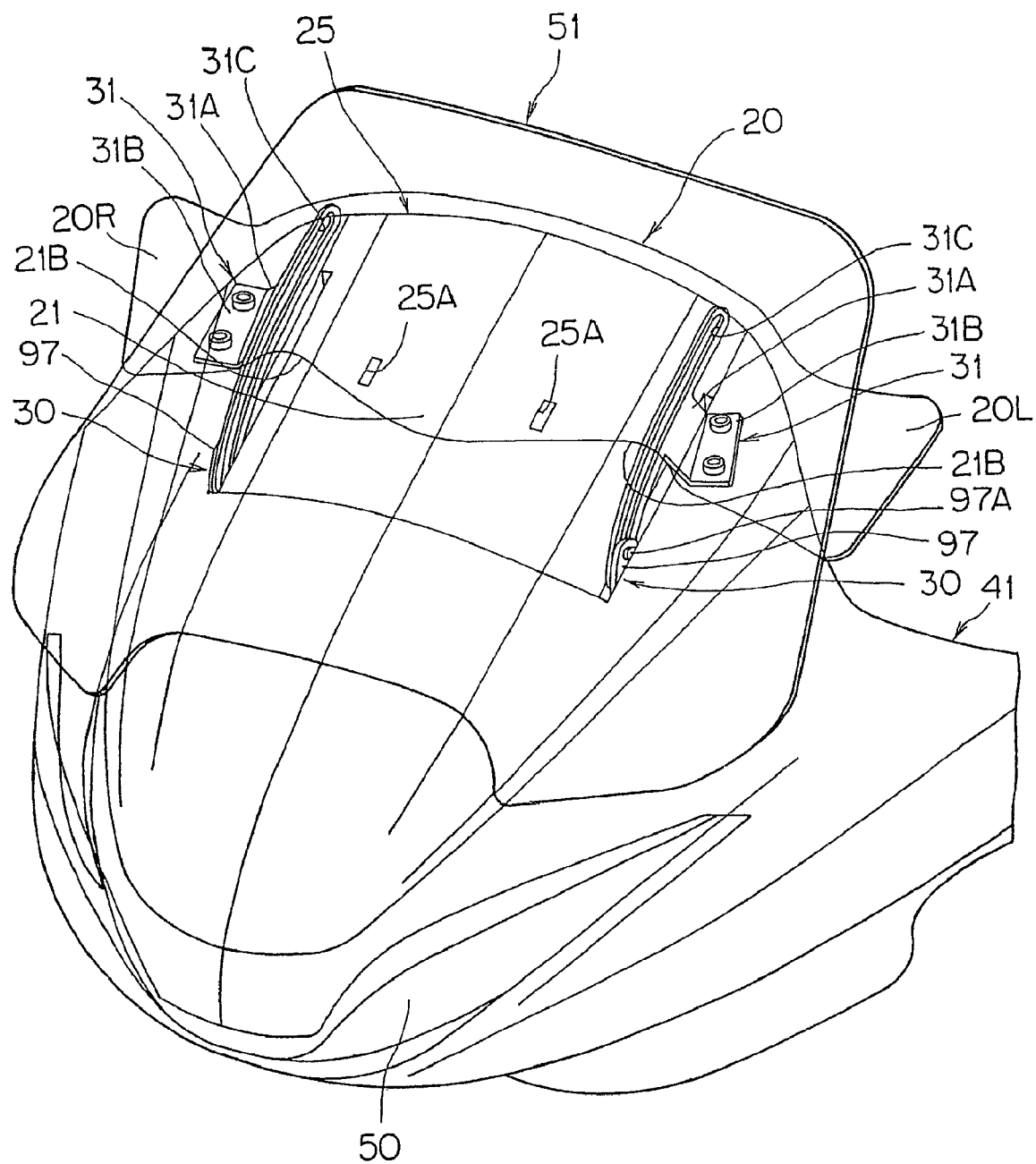
FIG. 1 is a perspective view showing a front portion of a motorcycle according to a first embodiment of the present invention.

FIG. 1 is a perspective view showing a front portion of a motorcycle according to a first embodiment of the present invention.

The motorcycle includes an upper cowling 41 which covers a front upper portion of a vehicle body, and a headlamp 50 disposed at a front portion of the upper cowling 41. A wind screen 51 is formed from a transparent resin material and is disposed at a front upper portion of the upper cowling 41.

Figure 2:
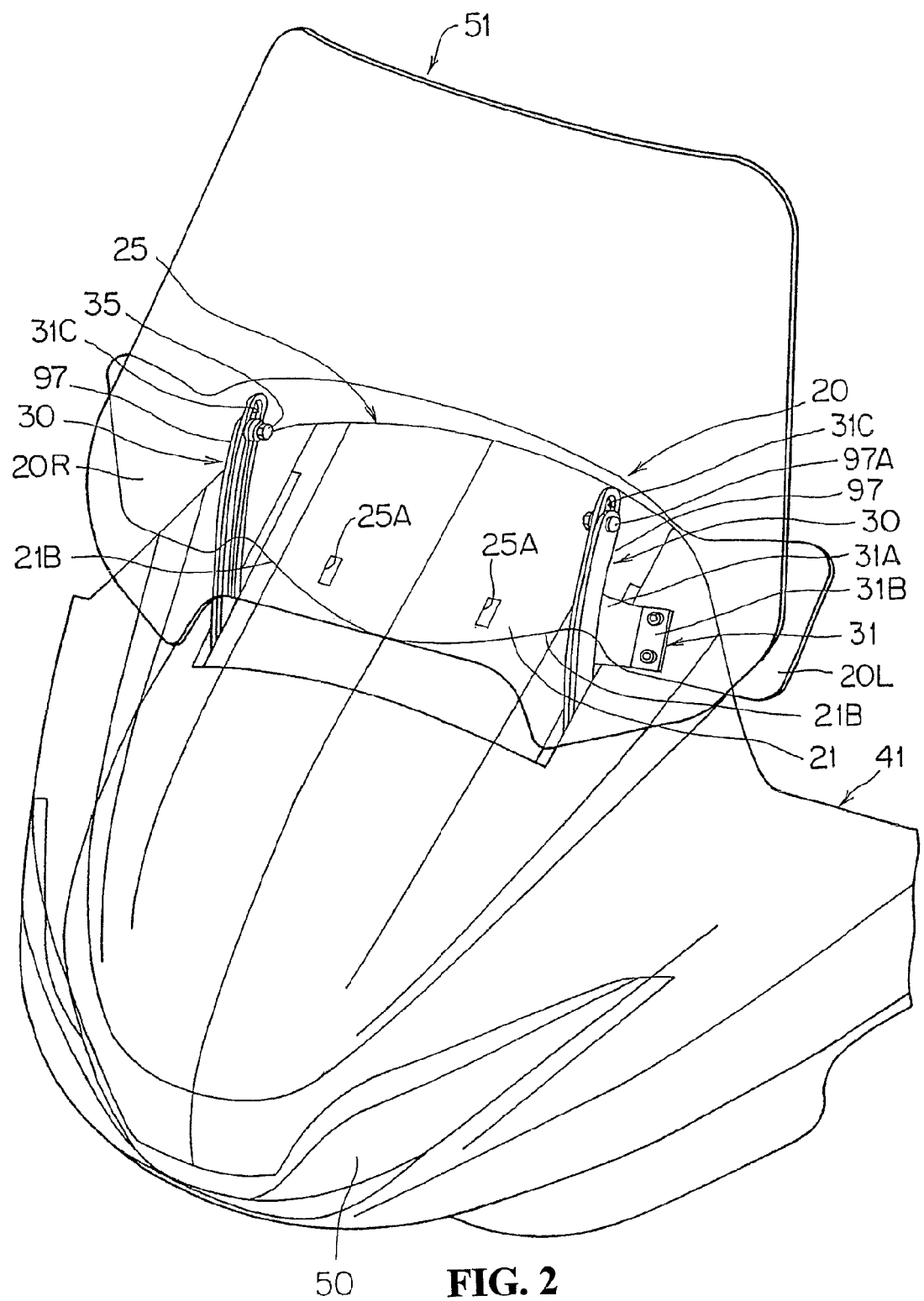
FIG. 2 is a perspective view showing a wind screen moved to a Hi position.

The upper cowling 41 is formed in a streamlined shape wherein it expands smoothly in a vehicle widthwise direction and an upward and downward direction toward the rear direction of the vehicle body such that air flow from forwardly of the vehicle body is rectified and flows around the driver without directly coming to the driver, and the wind screen 51 is formed in a substantially to be trapezoidal shape wherein the width thereof decreases toward the upward direction. This wind screen 51 is formed as a movable wind screen whose height and inclination angle can be adjusted by a moving mechanism 90 hereinafter described. FIG. 1 shows the wind screen 51 in a state wherein it is moved to a low position (Lo position) and FIG. 2 shows the wind screen 51 in another state wherein it is moved to a high position (Hi position).

Where the wind screen 51 is moved to the Hi position as shown in FIG. 2, it can exhibit a high wind protection effect suitable for high speed traveling (effect of reducing the wind pressure to the driver and wind noise and rectifying flows of air). On the other hand, where the wind screen 51 is moved to the Lo position as seen in FIG. 1, the effect can be adjusted to the wind protection effect that the driver feels an appropriate wind pressure suitable for middle or low speed traveling, and the agreeability upon traveling can be enhanced.

Figure 3:
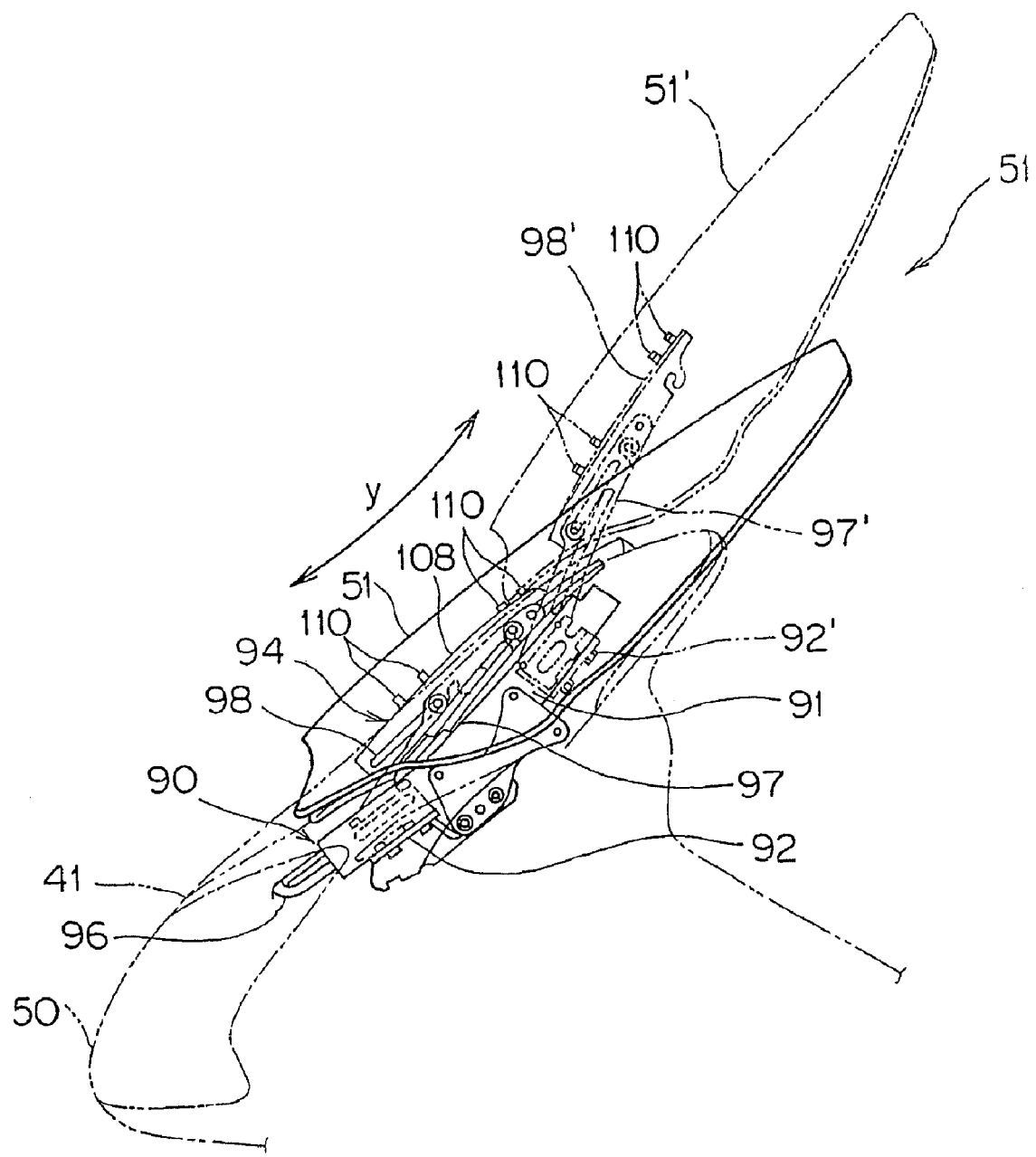
FIG. 3 is a side elevational view showing the wind screen together with a moving mechanism.

FIG. 3 is a side elevational view showing the wind screen 51 together with the moving mechanism 90, and the wind screen 51 at the Lo position is indicated by solid lines, and the wind screen 51 at the Hi position (wind screen 51' and so forth) is indicated by alternate long and two short dashes lines.

Figure 4A:
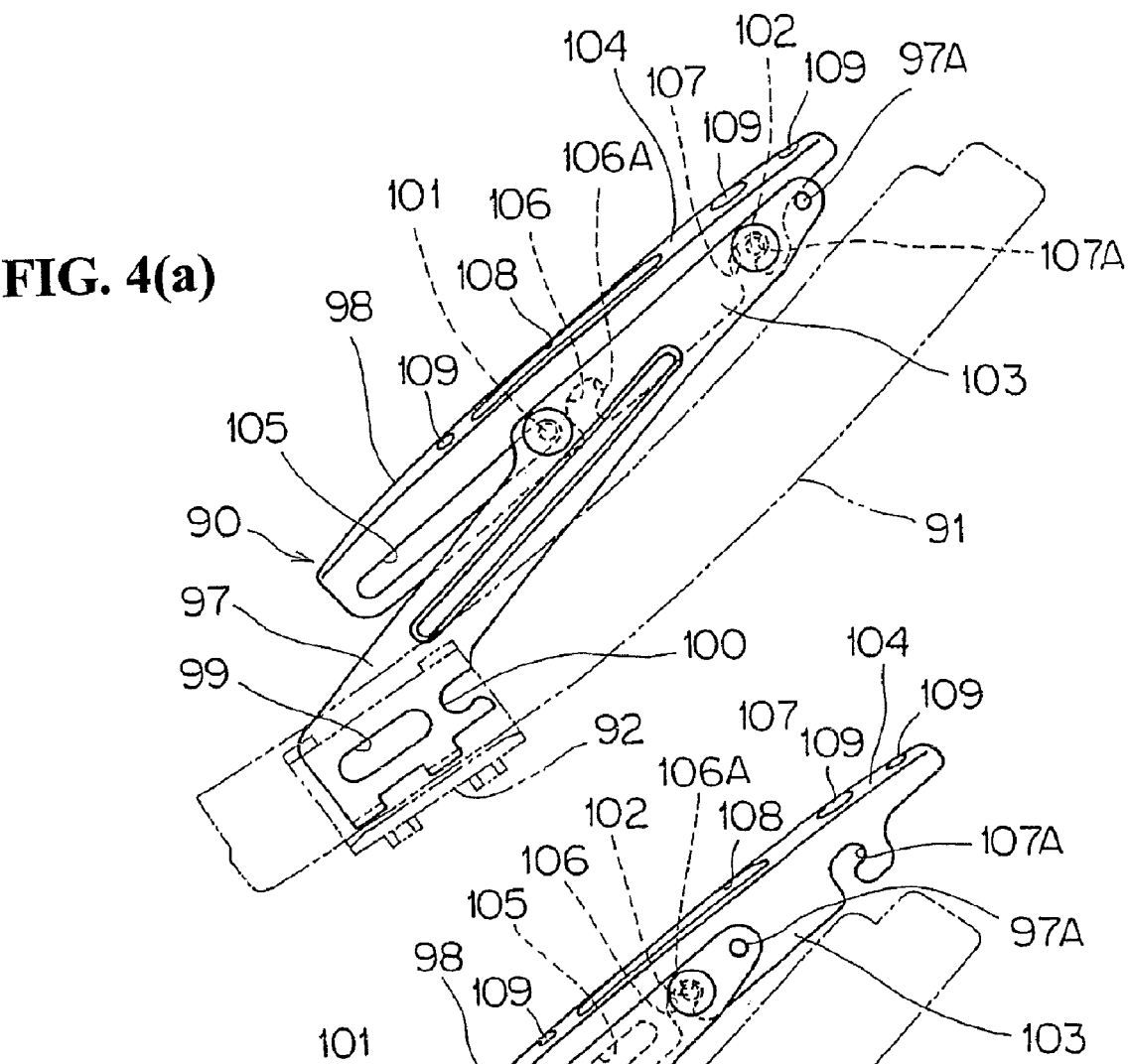
FIG. 4(a) is a view showing a mechanism section when the wind screen is at a Lo position.
Figure 4B:
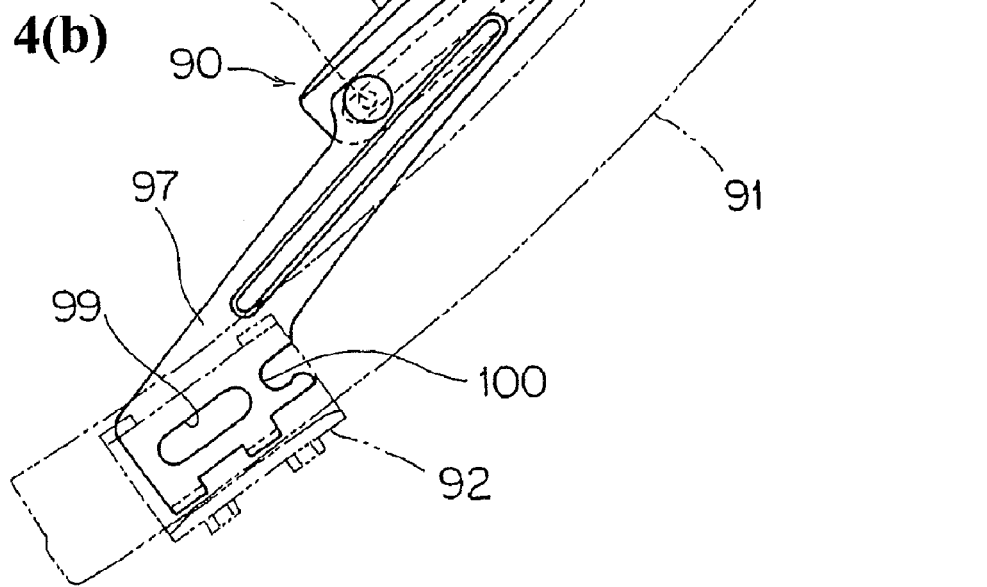
FIG. 4(b) is a view showing the mechanism section when the wind screen is at the Hi position.

Meanwhile, FIG. 4(a) is a view showing the mechanism section when the wind screen 51 is at the Lo position, and FIG. 4(b) is a view showing the mechanism section when the wind screen 51 at the Hi position. It is to be noted that, in FIGS. 4(a) and 4(b), a sub screen 20 hereinafter described is omitted.

As shown in FIG. 3, the wind screen 51 is disposed in an inclined relationship toward the rear direction of the vehicle body and is disposed for upward and downward movement while the inclination angle thereof is varied along the direction of an arrow mark y in which it is swollen a little toward the rear direction of the vehicle body as viewed in side elevation by the moving mechanism 90.

The moving mechanism 90 for moving the wind screen 51 along the direction of the arrow mark y includes a guide element (also called adjust rail) 91 mounted on the upper cowling 41 and extending in the direction of the arrow mark y, a movable element 92 supported for movement on the guide element 91, and a connection element 94 for connecting the wind screen 51 and the movable element 92 to each other.

A pair of guide elements 91 are provided and are supported on the inner side of the upper cowling 41, and the movable element 92 supported for sliding movement on the guide elements 91 is connected to an electric motor not shown disposed in the inner side of the upper cowling 41 through a push cable 96 such that it is moved in the upward and downward directions under the guidance of the guide elements 91 by driving of the electric motor.

The connection element 94 which connects the wind screen 51 and the movable element 92 to each other has a movable element fixing side stay (movable element fixing side member) 97 fixed to the movable element 92 and extending substantially in the direction indicated by the arrow mark y (inclined direction), and a screen fixing side stay (screen fixing side member) 98 fixed to the wind screen 51.

The movable element fixing side stay 97 of a substantially long plate-like shape includes a hole portion 99 and a cutaway portion 100 formed at a lower end side (vehicle body front side) and fixed to the movable element 92 by a fastening member such as a screw as seen in FIGS. 4(a) and 4(b), and a first projection (fixing portion) 101 and a second projection (fixing portion) 102 provided at predetermined distances in the longitudinal direction of the movable element fixing side stay 97. Of the projections, the first projection 101 is formed at a substantially central portion in the longitudinal direction of the movable element fixing side stay 97, and the second projection 102 is formed on an upper end side (vehicle body rear side) of the movable element fixing side stay 97. Since the movable element fixing side stay 97 is secured to the movable element 92 through the hole portion 99 and the cutaway portion 100, it moves together with movement of the movable element 92.

Meanwhile, the screen fixing side stay 98 has a first face 103 formed on a plate-like member of a substantially L shape as viewed on a section and connecting to the movable element fixing side stay 97, and a second face 104 connecting to the wind screen 51. On the first face 103 of the screen fixing side stay 98, an elongated hole portion 105 provided from a central portion in the longitudinal direction to the lower end side, a first recessed portion 106 cut away at a central portion of an end edge of the first face 103 and a second recessed portion 107 cut away on the end edge upper end side (vehicle body rear side) of the first face 103 are formed.

Meanwhile, the first recessed portion 106 and the second recessed portion 107 have locking portions 106A and 107A cut out toward the upper end side, respectively. And, the first and second recessed portions 106 and 107 having the locking portions 106A and 107A are engageable with the first and second projections 101 and 102 of the movable element fixing side stay 97, respectively. Further, the elongated hole portion 105 of the screen fixing side stay 98 is engageable with the first and second projections 101 and 102 of the movable element fixing side stay 97.

Meanwhile, on the second face 104 of the screen fixing side stay 98, an elongated hole portion 108 formed substantially at a central portion in the longitudinal direction and a plurality of (totaling three) hole portions 109 formed on the opposite sides of the elongated hole portion 108. Then, if the second face 104 of the screen fixing side stay 98 and the wind screen 51 are brought into contact with each other and the screen fixing side stay 98 and the wind screen 51 are connected to each other using fastening members 110 such as a screw through the elongated hole portion 108 and the hole portions 109 formed on the second face 104 of the screen fixing side stay 98 as shown in FIG. 3, then the screen fixing side stay 98 and the wind screen 51 are fixed to each other.

Here, as seen in FIGS. 4(a) and 4(b), the screen fixing side stay 98 can be fixed at two different positions in the longitudinal direction (direction of the arrow mark y, inclination direction) to the movable element fixing side stay 97. In order to fix the screen fixing side stay 98 at the Lo position (refer to FIG. 4(A)) to the movable element fixing side stay 97, the first projection 101 of the movable element fixing side stay 97 is engaged with the upper end side of the elongated hole portion 105 of the screen fixing side stay 98 and the second projection 102 of the movable element fixing side stay 97 is engaged with the locking portion 107A of the second recessed portion 107 of the screen fixing side stay 98. At this time, the first recessed portion 106 of the screen fixing side stay 98 does not engage with anything.

On the other hand, in order to fix the screen fixing side stay 98 at the Hi position (refer to FIG. 4(B)) to the movable element fixing side stay 97, the first projection 101 of the movable element fixing side stay 97 is engaged with the lower end side of the elongated hole portion 105 of the screen fixing side stay 97 and the second projection 102 of the movable element fixing side stay 97 is engaged with the locking portion 106A of the first recessed portion 106 of the screen fixing side stay 98. At this time, the second recessed portion 107 of the screen fixing side stay 98 does not engage with anything.

In this manner, the movable element fixing side stay 97 has the first projection 101 and the second projection 102 which can fix the screen fixing side stay 98 at two different positions substantially in the inclination direction to the movable element fixing side stay 97.

It is to be noted that this wind screen 51 is moved upwardly and downwardly in response to an operation of an operation switch (not shown) provided on the handle bar or the like of the motorcycle. In the present embodiment, as seen in FIGS. 3, 4(a) and 4(b), since the guide elements 91 is formed in a bow shape in which it is swollen a little toward the rear direction of the vehicle body, the wind screen 51 moved upwardly does not move in a direction in which it coincides fully with the inclination direction, but moves such that the upper end thereof is directed a little to the forward direction (that is, so that an upwardly erected state may be established) together with the upward movement, and the wind screen 51 moved downwardly is inclined toward the rear direction of the vehicle body together with the downward movement.

In the present configuration, a sub screen (baffle plate) 20 which is inclined toward the rear direction of the vehicle body is disposed between the upper cowling 41 and the wind screen 51 as seen in FIGS. 1 and 2. This sub screen 20 is formed such that the vertical length thereof is smaller than that of the wind screen 51 and the width thereof is greater than a maximum width of the wind screen 51 so that the wind pressure to the shoulder portions of the driver may be reduced. Further, the sub screen 20 is entirely formed as a unitary member from a transparent resin material in order to assure the forward sight.

Figure 5:
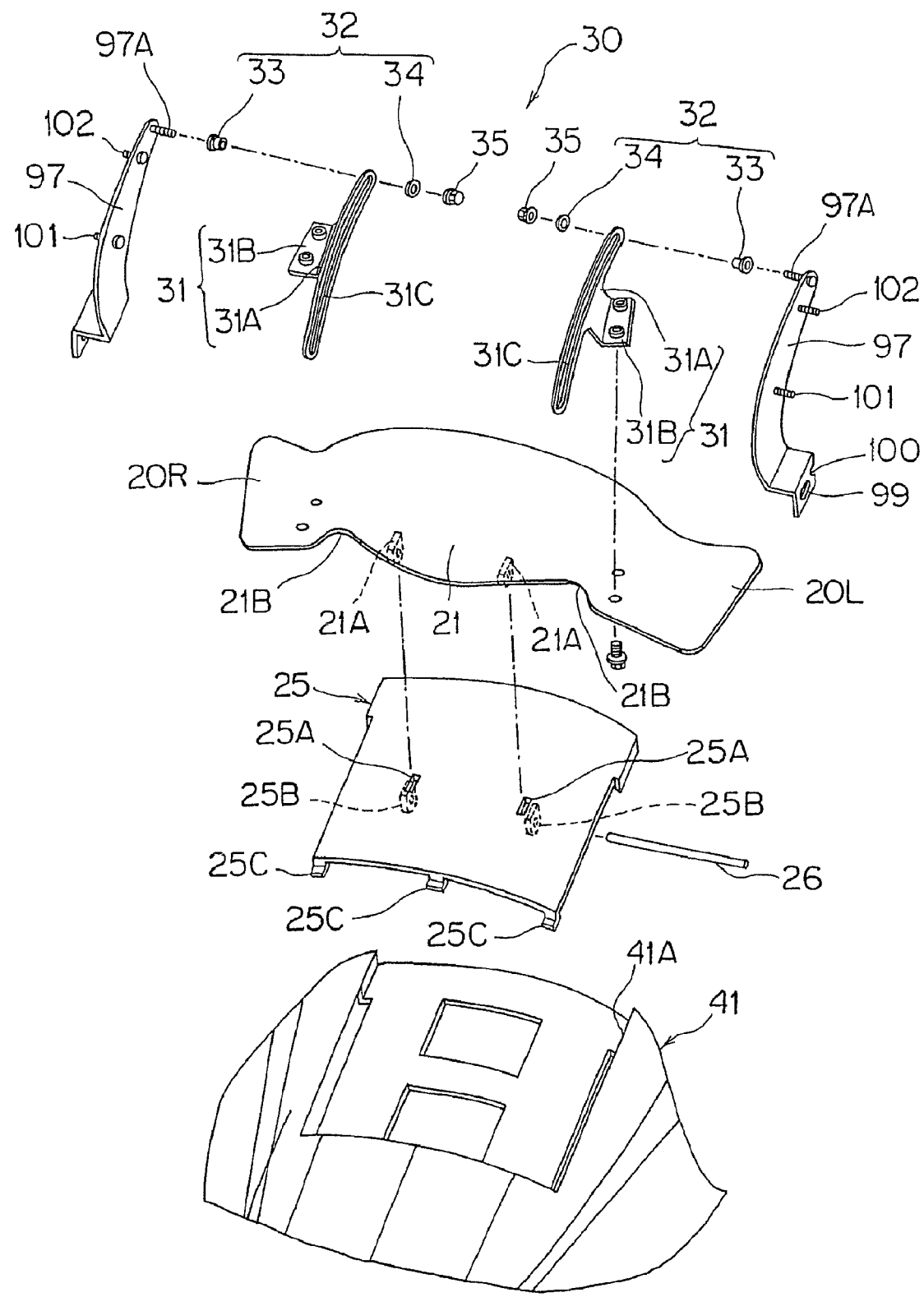
FIG. 5 is an exploded perspective view showing a sub screen together with peripheral elements.

FIG. 5 is an exploded perspective view showing the sub screen 20 together with peripheral elements.

The sub screen 20 includes a pair of left and right shaft fitting portions 21A, 21A provided at a lower end central portion 21 thereof so as to project to the rear face side, and the shaft fitting portions 21A, 21A are inserted into a pair of left and right hole portions 25A, 25A provided on a visor 25 which forms a lid for a recessed portion 41A formed at a front upper portion of the upper cowling 41. This visor 25 is fitted in the upper cowling 41 to form part of a surface member of the upper cowling 41, and a pair of left and right bearing portions 25B, 25B having holes communicating with holes of the shaft fitting portions 21A, 21A project on the reverse side of the visor 25. A single shaft 26 is fitted in the holes and the shaft 26 is prevented from coming off and connect the sub screen 20 and the visor 25 to each other. It is to be noted that, a locking portion locks the visor 25 to the upper cowling 41.

According to this connection structure, since a portion near to a lower end of the sub screen 20 is connected for sliding movement to the upper cowling 41 by means of a shaft, the sub screen 20 is connected for rocking motion to the upper cowling 41 while it keeps a state wherein the lower end thereof is positioned in the proximity of the surface of the upper cowling 41. Therefore, air flow flowing along the surface of the upper cowling 41 can be guided efficiently to the front face of the sub screen 20 and can flow to the rear direction of the vehicle body along the front face of the sub screen 20.

On the left and right sides of the lower end central portion 21 of the sub screen 20, escape portions 21B, 21B which form gaps with respect to the upper cowling 41 are formed as seen in FIG. 5. Those escape portions 21B, 21B are provided to introduce part of the air flow flowing along the surface of the upper cowling 41 to the rear of the sub screen 20. Therefore, part of the air flow can flow toward the driver on the rear side of the upper cowling 41, and the amount of the air flow flowing along the front face of the sub screen 20 can be adjusted appropriately.

The left and right end portions 20L, 20R of the sub screen 20 are curved a little toward a front upper portion of the vehicle body such that air flow from a forward direction of the vehicle body can flow to the obliquely upward side toward the rear direction of the vehicle body by the left and right end portions 20L, 20R of the sub screen 20. Therefore, in comparison with an alternative configuration wherein the left and right end portions 20L, 20R of the sub screen 20 are not curved, part of the air flow can be introduced toward the upward direction above the shoulders of the driver to appropriately reduce the wind pressure to the shoulder portions of the driver.

Further, in the present configuration, a connection mechanism 30 which forms the connection element 94 for connecting the sub screen 20 to the wind screen 51 is provided. This connection mechanism 30 functions also as an inclination angle variation mechanism for varying the inclination angle of the sub screen 20 in response to the inclination angle of the wind screen 51.

More particularly, the connection mechanism 30 has a pair of left and right sub screen connecting stays (baffle plate connecting stays) 31 for connecting the movable element fixing side stay 97, which connects the wind screen 51 and the movable element 92 to each other, and the sub screen 20 to each other.

Each of the sub screen connecting stays 31 includes a stay body 31A having an elongated hole portion 31C extending substantially obliquely upwards toward the rear direction of the vehicle body, and a bent plate portion 31B bent from a lower edge of the stay body 31A. The bent plate portion 31B is fixed to the sub screen 20 by means of a fastening member such as a screw to fix the stay body 31A in an uprightly erected state from the sub screen 20.

To the elongated hole portion 31C of the stay body 31A, a collar body 33 having a large diameter portion on one end side and a receiving member 34 which forms a large diameter portion on the other end side, which form a cylindrical collar 32 having large diameter portions for preventing the removal at the opposite ends thereof are inserted from the opposite left and right sides of and connected to the elongated hole portion 31C. The cylindrical collar 32 is mounted for sliding movement along the elongated hole portion 31C. In the cylindrical collar 32, a pin 97A which projects to the inner side of the vehicle body from the movable element fixing side stay 97 is fitted, and a nut 35 is fastened to the end portion of the pin 97A projecting from the cylindrical collar 32 to prevent the removal of the pin 97A. Since the pin 97A is mounted for sliding movement in the elongated hole portion 31C of the stay body 31A through the cylindrical collar 32, the sliding resistance can be reduced low by using a material having a low coefficient of friction for the cylindrical collar 32.

Figure 6:
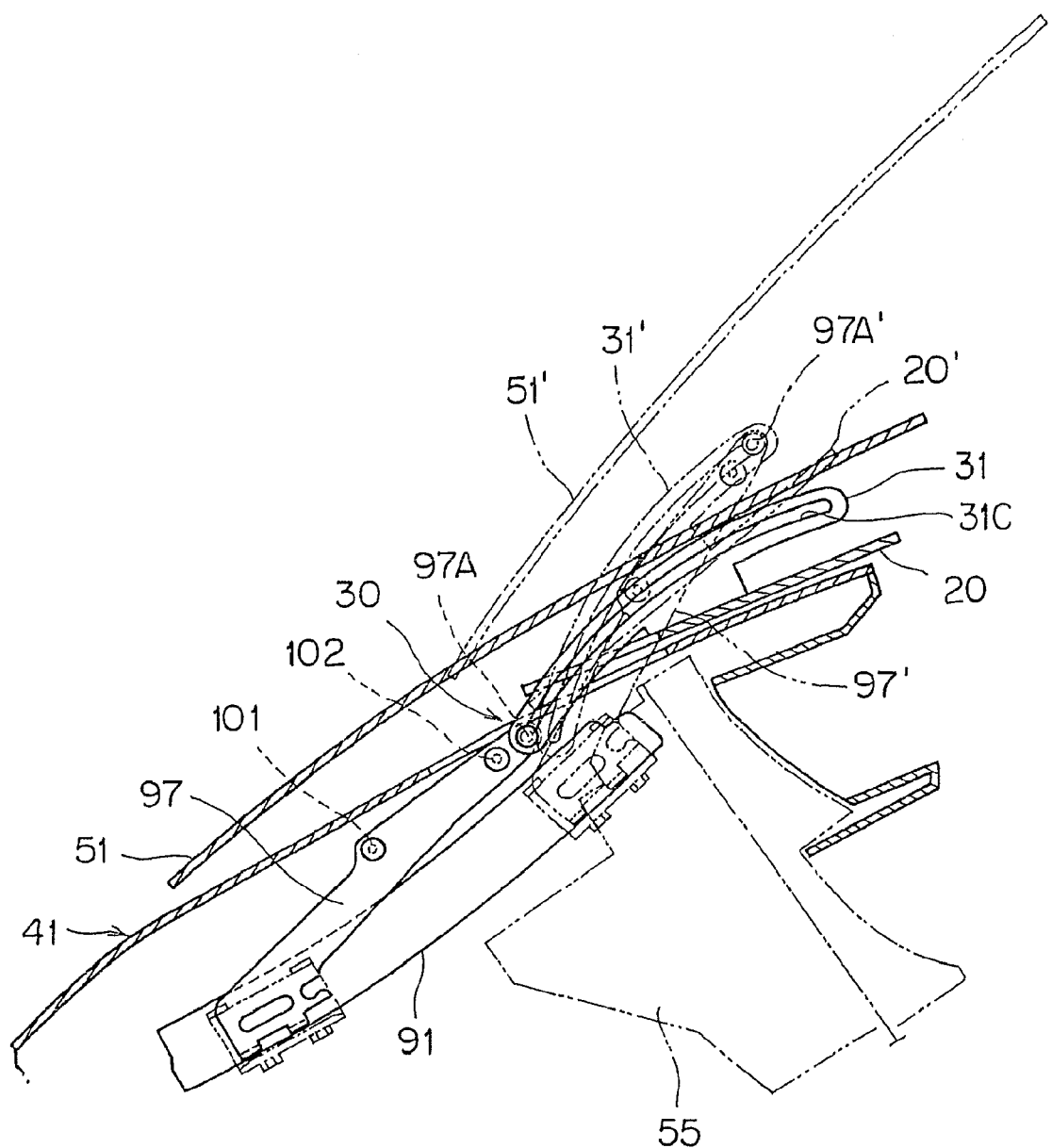
FIG. 6 is a view illustrating movement of the wind screen and the sub screen.

According to this configuration, when the wind screen 51 moves from the Lo position (indicated by solid lines in FIG. 6) to the Hi position (indicated by alternate long and two short dashes lines in FIG. 6) as seen in FIG. 6, the pin 97A of the movable element fixing side stay 97 moves in the rearwardly obliquely upward direction (rearward direction along the direction indicated by the arrow mark y) integrally with the wind screen 51 (97', 97A' in FIG. 6). Therefore, while the pin 97A moves to the rear side of the vehicle body within the elongated hole portion 31C of the sub screen connecting stay 31, it erects the sub screen connecting stay 31 uprightly around the center of rocking motion (corresponding to the axis of the shaft 26 (refer to FIG. 5)) (31' in FIG. 6). Together with the upright erection of the sub screen connecting stay 31, also the sub screen 20 to which the sub screen connecting stay 31 is fixed is erected uprightly (20' in FIG. 6) and the inclination angle of the sub screen 20 increases (indicated by alternate long and two short dashes lines in FIG. 6). In other words, the inclination angle of the sub screen 20 is adjusted to a large angle when the inclination angle of the wind screen 51 is large. It is to be noted that a meter unit 55 is disposed in a space rearwardly of the upper cowling 41.

On the other hand, where the wind screen 51 moves from the Hi position (indicated by alternate long and two short dashes lines in FIG. 6) to the Lo position (indicated by solid lines in FIG. 6), since the pin 97A of the movable element fixing side stay 97 moves in the forwardly obliquely downward direction (forward direction along the direction indicated by the arrow mark y) as seen in FIG. 1, while the pin 97A moves to the front side in the elongated hole portion 31C of the sub screen connecting stay 31, it lays the sub screen connecting stay 31 down to decrease the inclination angle of the sub screen 20 to which the sub screen connecting stay 31 is fixed (indicated by solid lines in FIG. 6). In other words, when the inclination angle of the wind screen 51 is small, the inclination angle of the sub screen 20 is adjusted to a small angle.

The connection mechanism 30 described above automatically changes the inclination angle of the sub screen 20 in an interlocking relationship with the inclination angle of the wind screen 51 in this manner. Further, in the present configuration, the connection mechanism 30 is configured such that the inclination angle of the sub screen 20 is adjusted to an angle which substantially coincides with the inclination angle of the wind screen 51 as seen in FIG. 6.

Therefore, at whichever one of the Lo position and the Hi position the wind screen 51 is positioned, or even if the wind screen 51 is positioned at an intermediate position between them, air flow from between the upper cowling 41 and the wind screen 51 can be let flow along the rear face of the wind screen 51 by the sub screen 20. Accordingly, the space between the wind screen 51 and the driver is prevented from being placed into a negative pressure state.

As described above, according to the present embodiment, since the sub screen 20 which is inclined toward the rear direction of the vehicle body is provided between the upper cowling 41 and the wind screen 51 and the sub screen 20 is configured such that the inclination angle thereof can be adjusted so that air flow from between the upper cowling 41 and the wind screen 51 can flow along the rear face of the wind screen 51 by the sub screen 20, even if the inclination angle of the wind screen 51 is changed, the air flow can always flow along the rear face of the wind screen 51.

Consequently, the situation wherein the space between the wind screen 51 and the driver is placed into a negative pressure state can be prevented without limiting the inclination angle or the height of the wind screen 51 of the movable type. Thus, for example, a specification change such as to configure the wind screen 51 for adjustment to a higher position can be readily carried out.

Since the connection mechanism 30 which connects the sub screen 20 and the wind screen 51 to each other varies the inclination angle of the sub screen 20 in response to the inclination angle of the wind screen 51, in comparison with an alternative case wherein the individual inclination angles of the wind screen 51 and the sub screen 20 are varied by separate mechanisms, simplification of the configuration such as a reduction in the number of parts is possible. In addition, it is possible to readily adjust the inclination angle of the sub screen 20 to the inclination angle of the wind screen 51.

Further, since the sub screen 20 is connected for rocking motion to the upper cowling 41 while a state wherein the lower end thereof is positioned in the proximity of the surface of the upper cowling 41 is maintained, a quantity of air flow flowing along the surface of the upper cowling 41 can be introduced efficiently to the front face of the sub screen 20, and sufficient air flow can flow readily along the rear face of the wind screen 51.

Further, since the sub screen 20 is formed with a width greater than that of the wind screen 51, rectification of the air flow and reduction of the wind pressure to the driver can be carried out by both of the wind screen 51 and the sub screen 20. Therefore, the rectification effect and the windbreak effect can be improved. Even in the case where the specifications change such as to configure the wind screen 51 to be decreased in width, the rectification effect and the windbreak effect can be secured sufficiently by the sub screen 20, and also the degree of freedom in planning and the degree of freedom in design of the wind screen 51 can be improved.

FIGS. 7 to 10 show a screen for a motorcycle according to a second embodiment.

Figure 7:
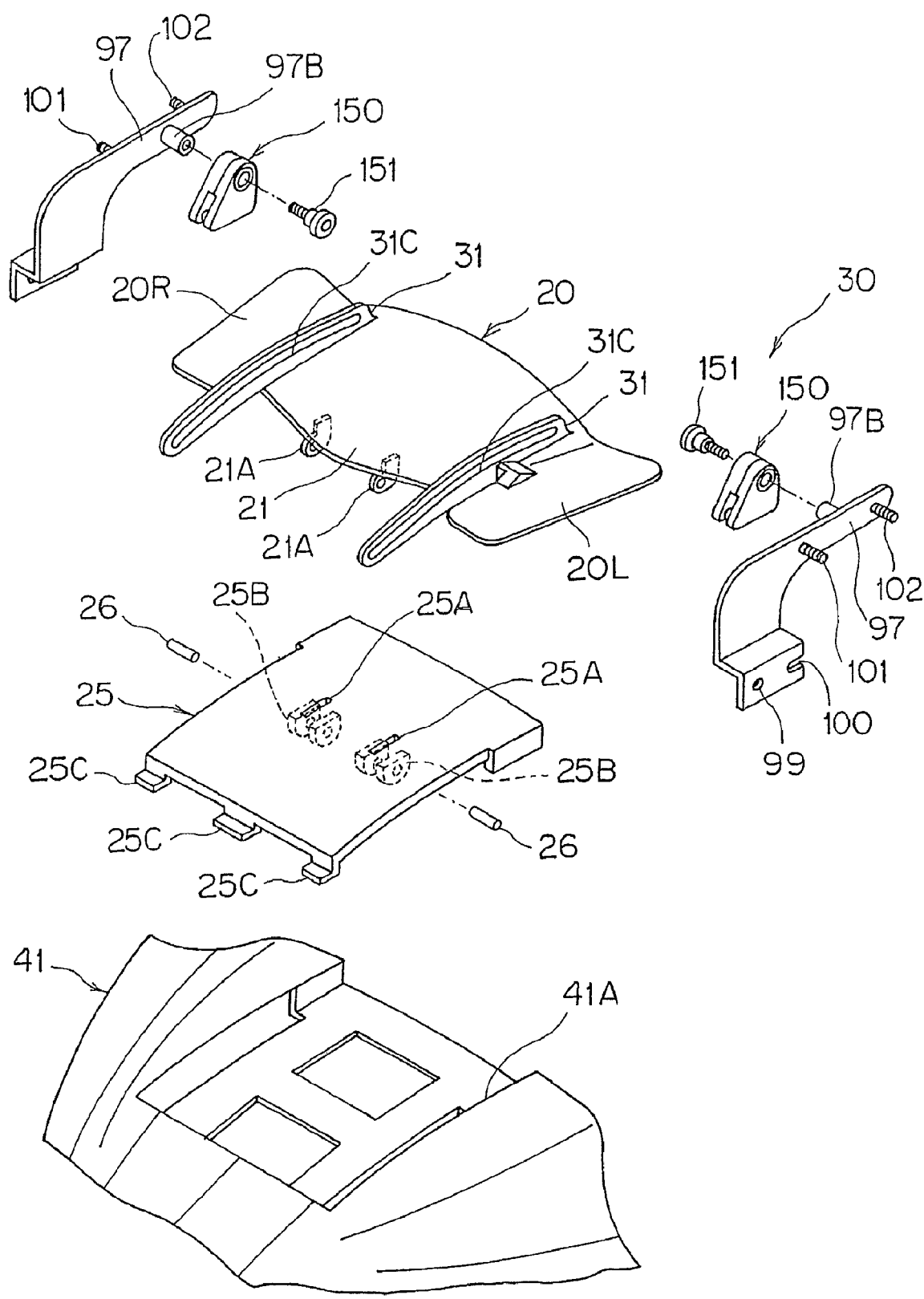
FIG. 7 is an exploded perspective view illustrating a screen for a motorcycle according to a second embodiment.

In the second embodiment, the connection mechanism 30 which connects the sub screen 20 to the wind screen 51 includes a pair of left and right sub screen holders (hereinafter referred to as holders) 150 provided on the wind screen 51 side, and the sub screen 20 is connected to the wind screen 51 through the holders 150 as seen in FIG. 7.

More particularly, a pair of left and right movable element fixing side stays 97 are attached to the wind screen 51 as shown in FIG. 7. Boss portions 97B which project from the inner side faces are provided individually on the movable element fixing side stays 97, and the holders 150 are fitted on the boss portions 97B and screws 151 are tightened. In this instance, the holders 150 are supported for pivotal motion (for tilting motion) around the boss portions 97B respectively.

Figure 8:
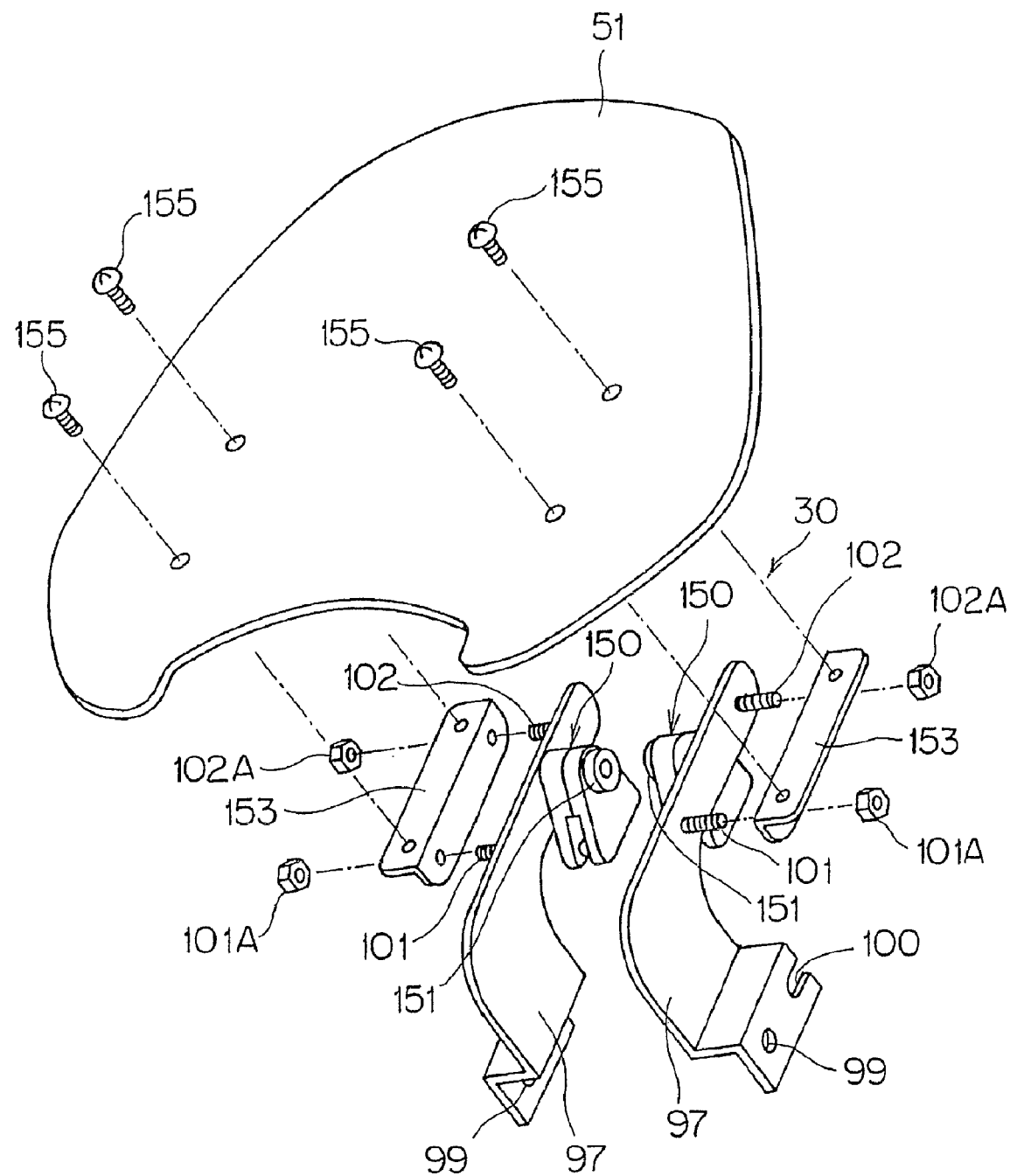
FIG. 8 is an exploded perspective view showing a connection structure of a wind screen.

Support plates 153 of a substantially L-shaped section are secured to the pair of left and right movable element fixing side stays 97 through first projections 101 and second projections 102 by nuts 101A and 102B, respectively as seen in FIG. 8. The wind screen 51 is fixed to the pair of left and right support plates 153 by means of a plurality of bolts 155, and the wind screen 51 and the movable element fixing side stays 97 are connected integrally thereby. It is to be noted that the connection structure is same as that in the first embodiment.

Figure 9:
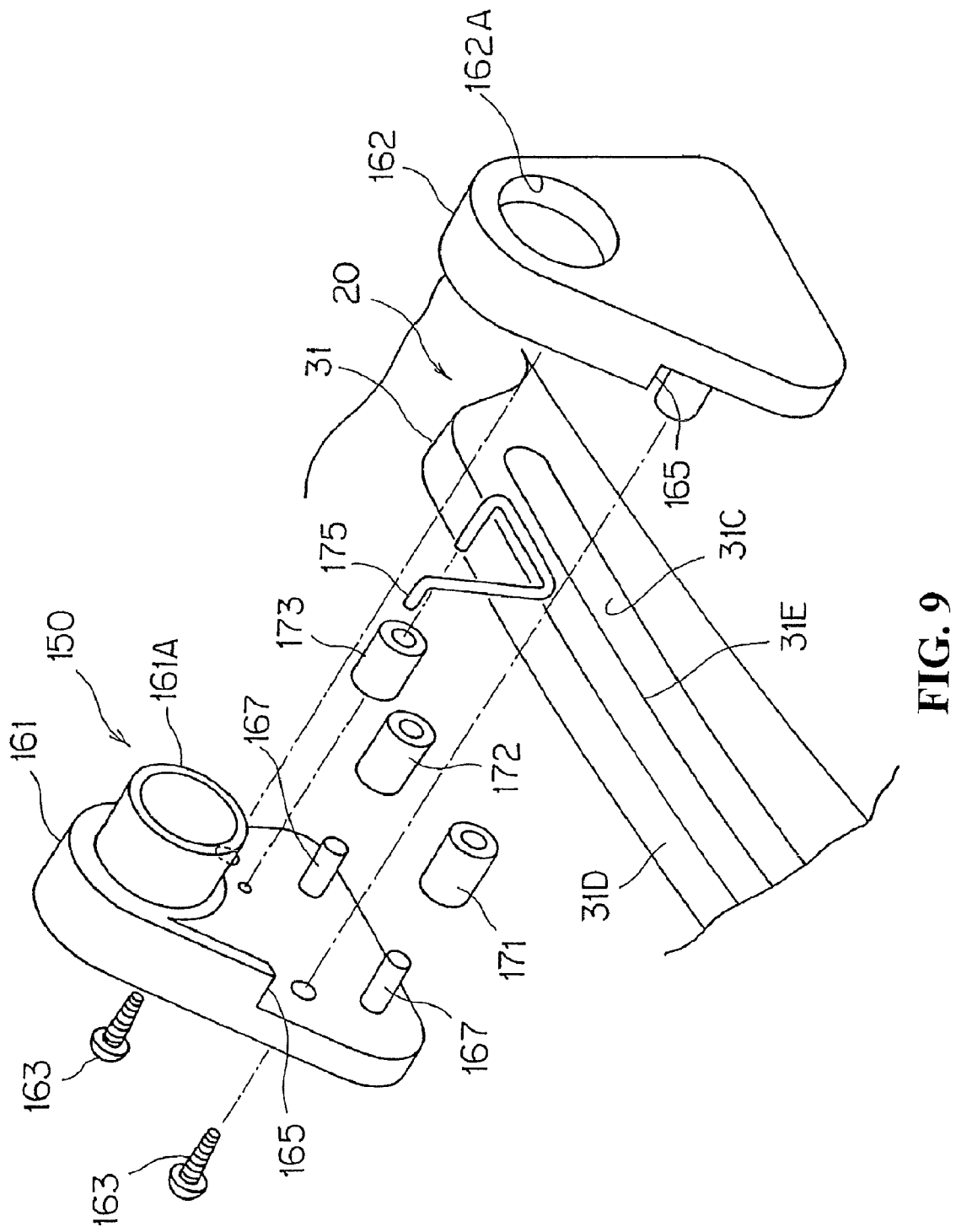
FIG. 9 is an exploded perspective view showing a sub screen holder together with peripheral elements.

FIG. 9 is an exploded perspective view showing the holder 150 together with peripheral elements. The holder 150 is formed from a pair of left and right holder elements 161 and 162 connected to each other by bolts 153. A groove portion 165 into and from which a pair of left and right sub screen connecting stays 31 provided on the sub screen 20 can be advanced and retracted is provided between the holder elements 161 and 162. A plurality of (three in the present example) rolling members 171, 172 and 173 are supported for rotation on the inner side of the groove portion 165. It is to be noted that, in FIG. 9, a bearing portion 161A is provided for supporting the boss portions 97B of the movable element fixing side stays 97 for pivotal motion, and a hole portion 162A is provided in which an end portion of the bearing portion 161A is fitted.

The rolling members 171 to 173 include a plurality of (two in the example) first rolling members 171 and 172 fitted in the elongated hole portion 31C formed in the sub screen connecting stay 31, and a second rolling member 173 which contacts with an upper face 31D of the sub screen connecting stay 31. The first rolling members 171 and 172 are supported for rotation on shaft portions 166 and 167 which project from the holder element 161, and the second rolling member 173 is supported for rotation on the holder element 161 through a biasing member 175.

Where the holder 150 is mounted on the sub screen connecting stay 31, the pair of left and right holder elements 161 and 162 are connected in such a manner as to sandwich the sub screen connecting stay 31 from the left and right. In this instance, the first rolling members 171 and 172 are inserted in the elongated hole portion 31C extending along the longitudinal direction of the sub screen connecting stay 31 and connect the holder 150 and the sub screen connecting stay 31 through the first rolling members 171 and 172.

The biasing member 175 biases the second rolling member 173 such that, when the holder 150 and the sub screen connecting stay 31 are connected to each other, the second rolling member 173 is pressed against the upper face 31D which extends in the longitudinal direction of the sub screen connecting stay 31, and is formed by bending a spring wire member in such a manner as seen in FIG. 9.

Figure 10:
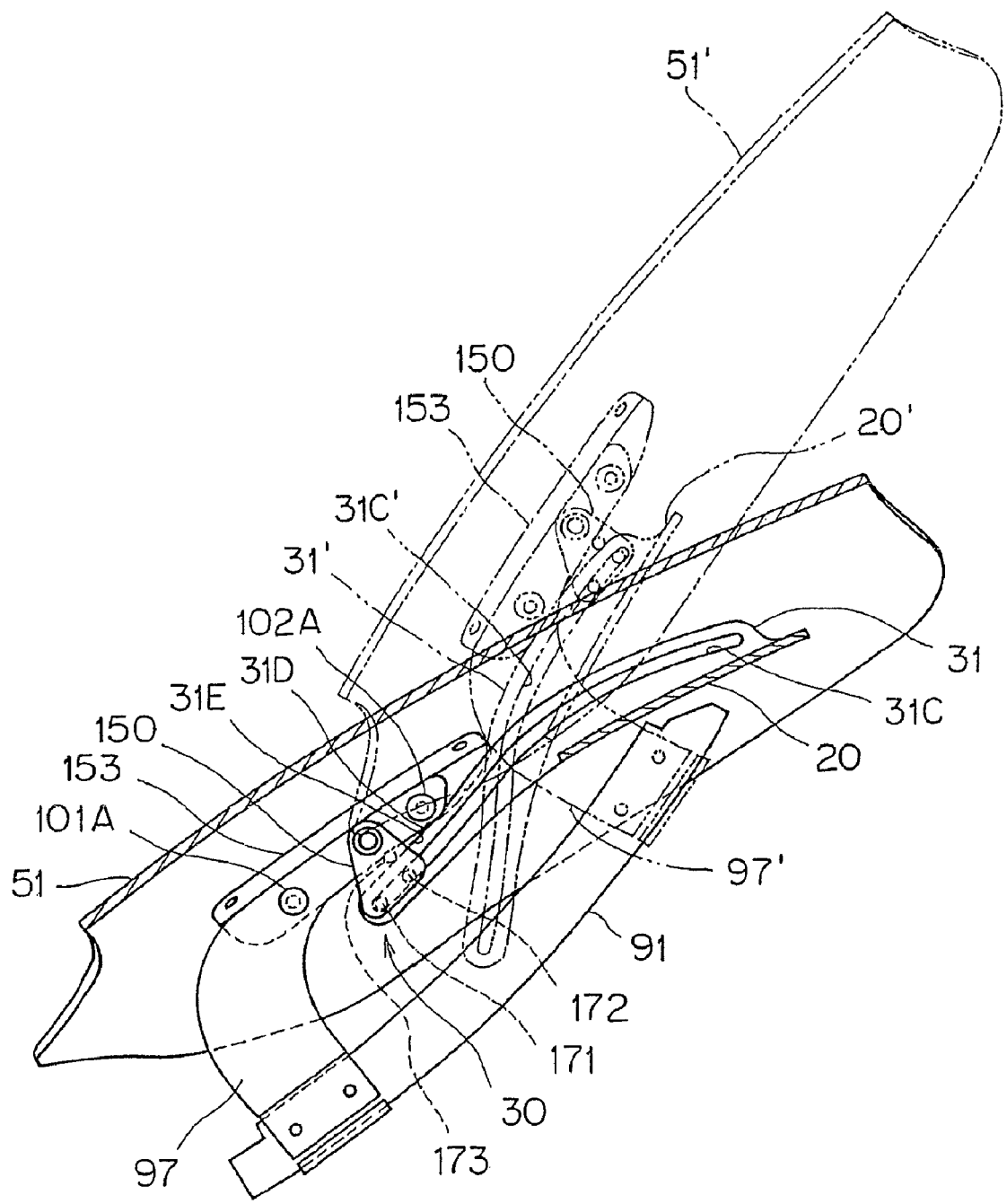
FIG. 10 is a view illustrating movement of the wind screen and the sub screen.

By the biasing member 175, the second rolling member 173 is pressed against the upper face 31D of the sub screen connecting stay 31, and by this reactive force, the first rolling members 171 and 172 are pressed against an upper side inner face 31E of the elongated hole portion 31C of the sub screen connecting stay 31. In particular, the sub screen connecting stay 31 is sandwiched from above and below by the first rolling members 171 and 172 and the second rolling member 173 as shown in FIG. 10. Therefore, the connection strength between the holder 150 and the sub screen connecting stay 31 is assured sufficiently, and the holder 150 can be slidably moved along the sub screen connecting stay 31 through the rolling members 171 to 173. Upon such sliding movement, since the rolling members 171 to 173 roll, the sliding resistance can be reduced.

According to this configuration, when the wind screen 51 is at the Lo position (indicated by solid lines in FIG. 10), the holder 150 is positioned on the front side of the sub screen connecting stay 31 as seen in FIG. 10, and at this position, the sub screen 20 is kept in a state wherein the inclination angle is small similarly to the wind screen 51.

On the other hand, if the wind screen 51 moves from the Lo position to the Hi position (indicated by alternate long and two short dashes lines in FIG. 10), then the holder 150 (150' in FIG. 10) moves to the rearwardly obliquely upward direction (direction in which the guide elements 91 extends) of the vehicle body integrally with the wind screen 51 (51' in FIG. 10). Therefore, while the holder 150 moves toward the rear side of the vehicle body within the elongated hole portion 31C of the sub screen connecting stay 31 (31' in FIG. 10), it uprightly erects the sub screen connecting stay 31 around the center of rocking motion (corresponding to the axis of the shaft 26 (refer to FIG. 7)). Together with the upright erection of the sub screen connecting stay 31, also the sub screen 20 (20' in FIG. 10) to which the sub screen connecting stay 31 is fixed is erected uprightly and the inclination angle of the sub screen 20 increases. By this, the inclination angle of the wind screen 51 and the inclination angle of the sub screen 20 can be normally kept to the same angle similarly as in the first embodiment.

According to the present embodiment, the connection mechanism 30 includes the sub screen connecting stay 31 provided on the sub screen 20 and extending in the forward and backward direction of the vehicle body and further includes the sub screen holder 150 provided on the wind screen 51 and holding the stay 31 for sliding movement along the sub screen connecting stay 31. Therefore, in comparison with an alternative case wherein the inclination angles of the wind screen 51 and the sub screen 20 are changed by separate mechanisms from each other, the inclination angles of the wind screen 51 and the sub screen 20 can be normally kept to the same angle by a simple configuration.

Further, in the present embodiment, since the sub screen holder 150 slidably moves on the sub screen connecting stay 31 through the plurality of rolling members 171 to 173, the sliding resistance can be reduced.

Figure 11:
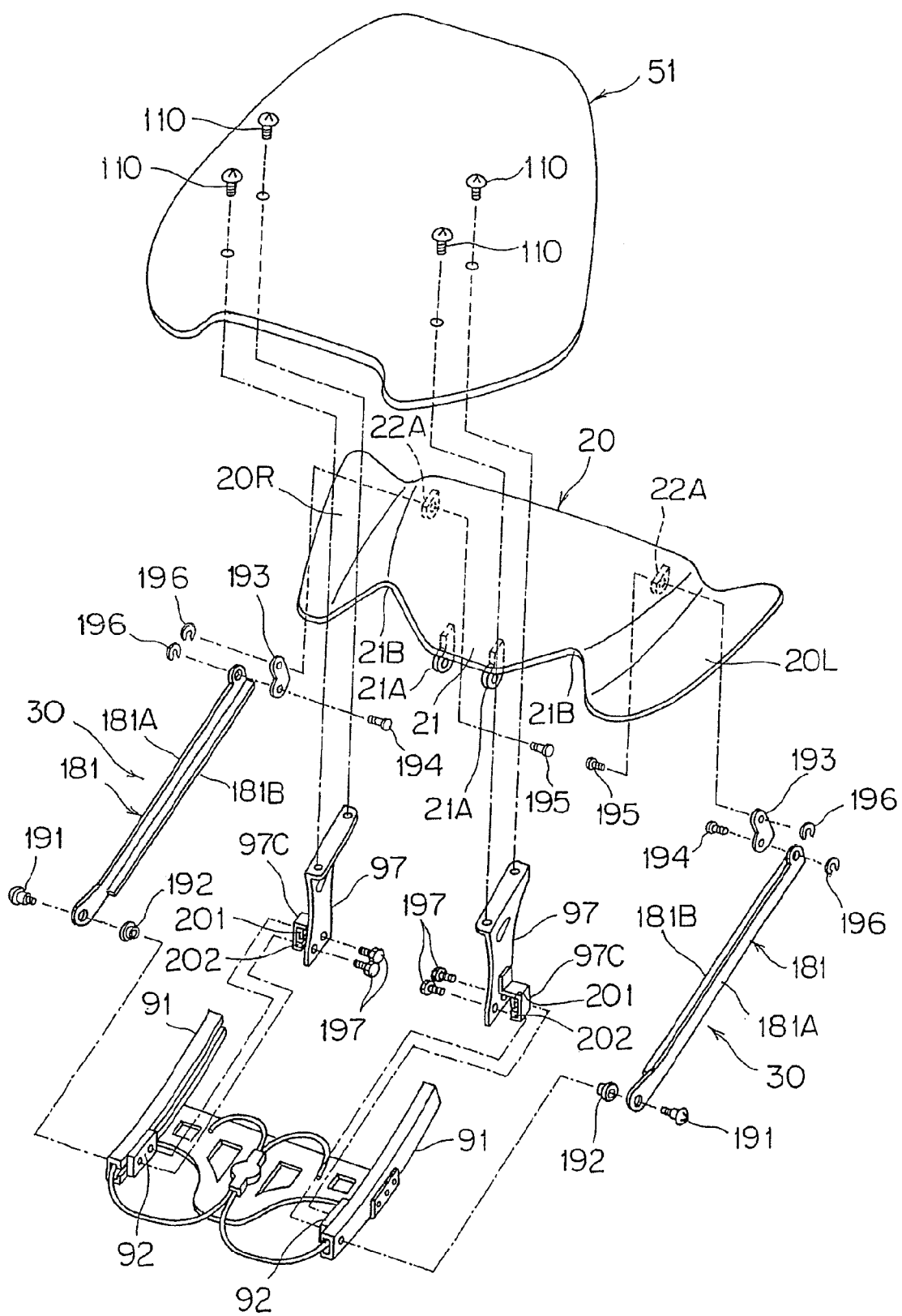
FIG. 11 is an exploded perspective view showing a screen for a motorcycle according to a third embodiment together with peripheral elements.
Figure 12:
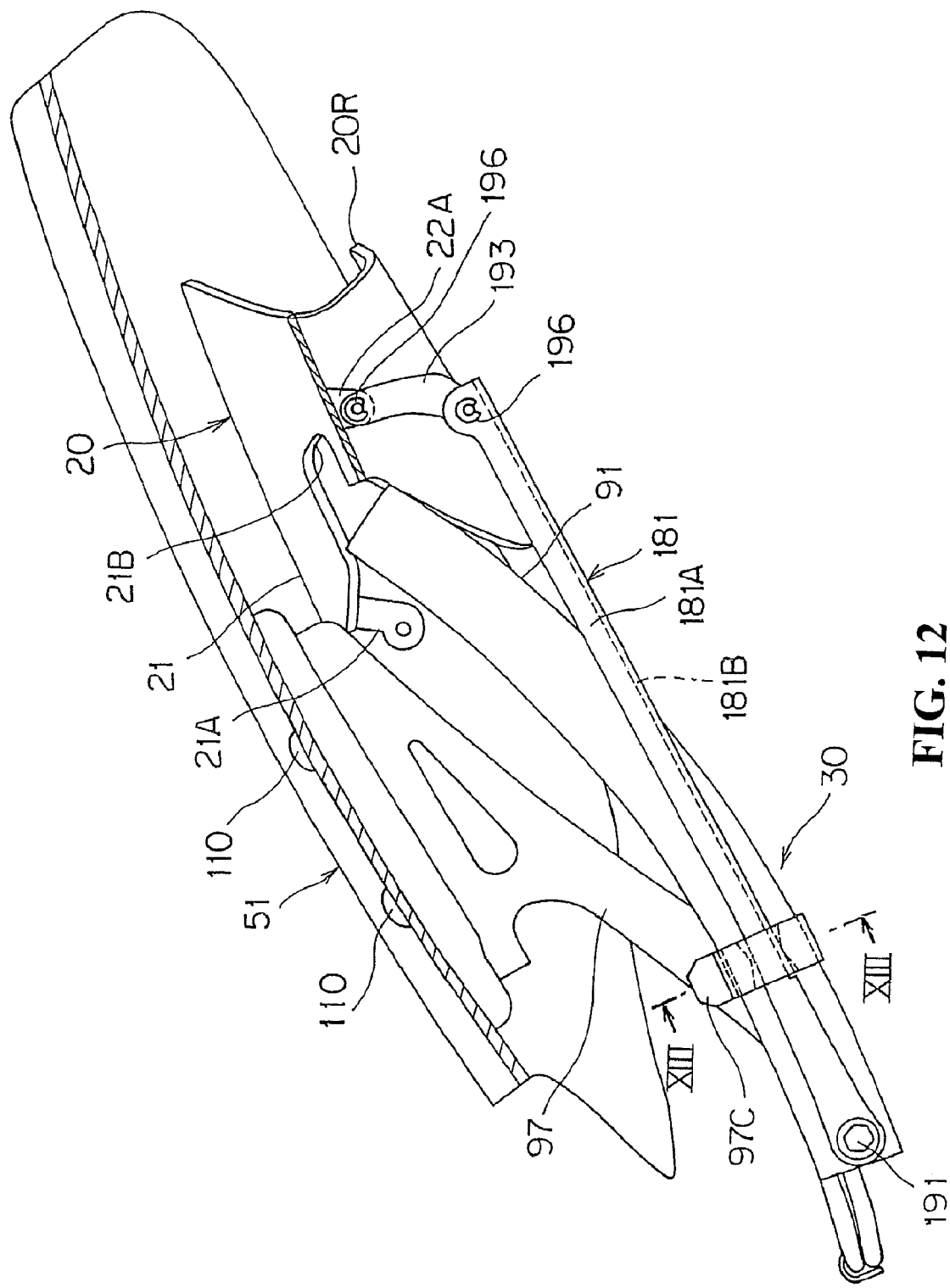
FIG. 12 is a side elevational sectional view of a screen for a motorcycle.
Figure 13:
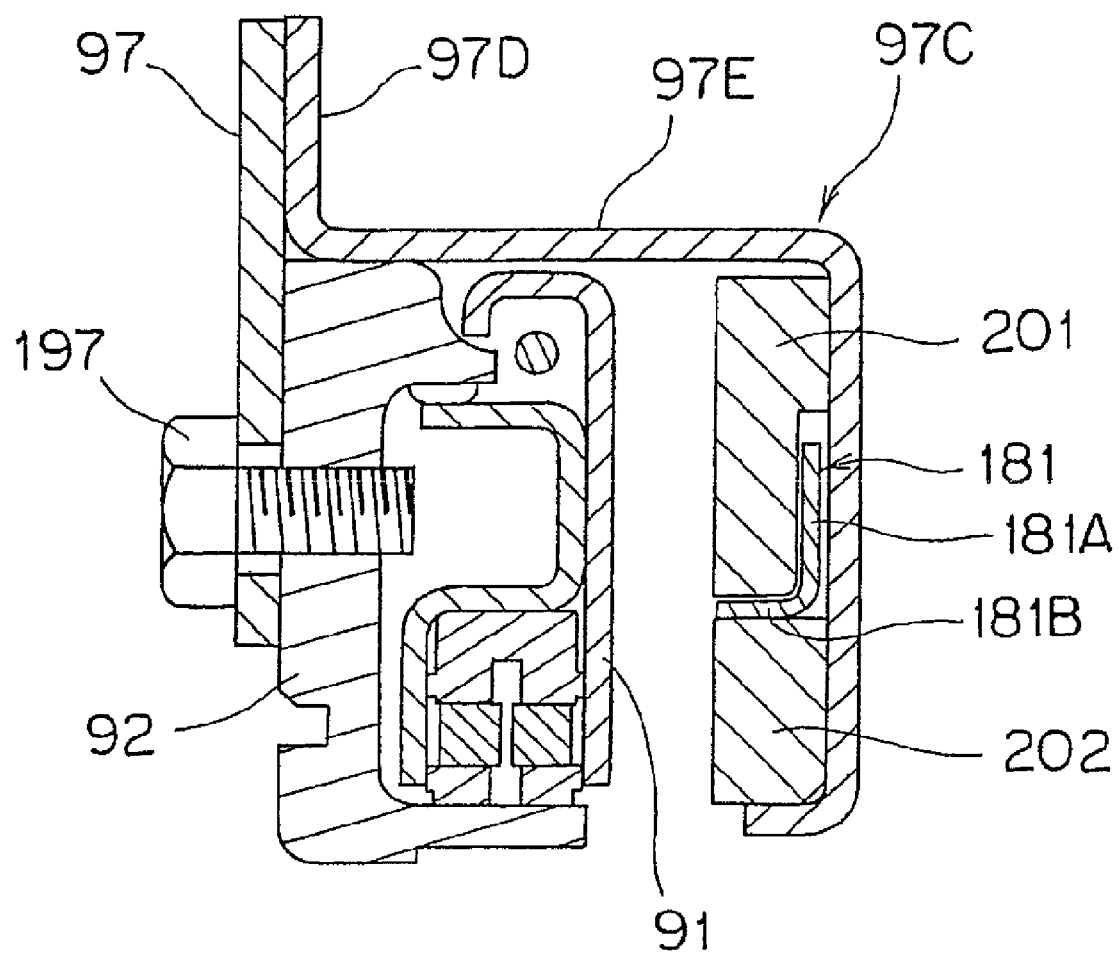
FIG. 13 is a sectional view taken along line XIII-XIII of FIG. 12.

FIGS. 11 to 13 show a screen of a motorcycle according to a third embodiment. Here, FIG. 11 is an exploded perspective view showing the screen together with peripheral elements, FIG. 12 is a side sectional view of the screen, and FIG. 13 is a sectional view taken along line XIII-XIII of FIG. 12.

In the third embodiment, as shown in FIGS. 1I and 12, a pair of left and right guide arms 181, 181 extending along the forward and backward direction below the sub screen 20 are provided, and a mechanism for varying the inclination angle of the sub screen 20 in response to movement of the wind screen 51, that is, the connection mechanism 30 for connecting the sub screen 20 to the wind screen 51, is formed from the guide arms 181, 181.

More particularly, the pair of left and right guide arms 181, 181 are formed from plate-formed members of a substantially L-shaped sectional shape wherein vertical plate portions 181A, 181A mounted at end portions thereof for pivotal motion on side faces of the pair of left and right guide elements 91, 91 and extending rearwardly and bent plate portions 181B, 181B bent to the inner side along lower edges of the vertical plate portions 181A, 181A are provided integrally. It is to be noted that the bent plate portion 181B is not formed at a front end and a rear end of the vertical plate portion 181A but is formed only between the front and the rear end.

The front ends of the vertical plate portions 181A, 181A are mounted for pivotal motion on side faces of the pair of left and right guide elements 91, 91 through bolts 191 and collars 192 respectively. Consequently, the left and right guide arms 181, 181 are supported for pivotal motion around an axis of the bolts 191 extending in the vehicle widthwise direction on the guide elements 91, 91. Here, the collars 192 are formed from a low friction material and are disposed between the guide arms 181 and the guide elements 91 to reduce the sliding resistance upon pivotal motion of the guide arms 181.

Meanwhile, the vertical plate portions 181A, 181A are connected at the rear end thereof to a pair of left and right downward projections 22A, 22A of the sub screen 20 through a pair of left and right arms 193, 193. More particularly, the pair of left and right arms 193, 193 are connected at one end (lower end) thereof to the rear ends of the vertical plate portions 181A, 181A individually by pins 194, 194, and are connected at the other end (upper end) thereof to the downward projections 22A, 22A of the sub screen 20 individually by pins 195, 195. It is to be noted that, in FIGS. 11 and 12 a snap ring 196 is provided (for example, E-shaped snap ring (so-called E ring)) for fastening the pins 194, 195 used for pin-connection of the arms 193.

A pair of left and right movable element fixing side stays 97, 97 connected to the wind screen 51 are connected to movable elements 92, 92 disposed on the inner side of the pair of left and right guide elements 91 by a pair of front and rear bolts 197, 197. In particular, movable element fixing side stays 97 and guide arms 181 are separately disposed on the inner side and the outer side of the guide elements 91 thereby to achieve a configuration which does not require a separate provision of mounting portions for the parts (movable element fixing side stays 97 and guide arms 181).

Holders (guide arm holders) 97C, 97C which extend to the outside in the vehicle widthwise direction of the stays 97, 97 for holding the pair of left and right guide arms 181, 181 are individually provided on the movable element fixing side stays 97. As shown in FIG. 13, the holders 97C, 97C include plate-formed members on which stay fixing portions 97D, 97D fixed by welding to the movable element fixing side stays 97 and bent plate portions 97E, 97E bent in a substantially L shape from the movable element fixing side stays 97 are provided integrally. A pair of upper and lower sliders 201 and 202 for holding the guide arms 181, 181 from above and below are mounted on the bent plate portions 97E, 97E, and the sliding resistance with the guide arms 181, 181 is reduced by the sliders 201 and 202 to support the guide arms 181, 181 for sliding movement.

Since the left and right guide arms 181, 181 are supported for sliding movement on the holders 97C, 97C which move integrally with the left and right movable element fixing side stays 97, 97, if the movable element fixing side stays 97, 97 are moved upwardly and downwardly along the guide elements 91, 91, then the left and right guide arms 181, 181 supported on the holders 97C, 97C of the movable element fixing side stays 97, 97 are rocked upwardly and downwardly with reference to an end thereof (axis of the bolts 191). Therefore, the rear ends of the guide arms 181, 181 move upwardly and downwardly to move a rear portion of the sub screen 20 upwardly and downwardly through the arms 193, 193, whereby the sub screen 20 can be tilted around the shaft 26 (refer to FIG. 5 or 7) extending through the shaft fitting portions 21A, 21A provided at the front portion of the sub screen 20 to vary the inclination angle.

Accordingly, if the movable element fixing side stays 97 are moved to vary the inclination angle of the wind screen 51, then the guide arms 181, 181 are rocked in response to the movement of the stays 97 to vary the inclination angle of the sub screen 20, and the inclination angle of the wind screen 51 and the inclination angle of the sub screen 20 can be held at a substantially equal angle similarly as in the first embodiment.

As described above, according to the present embodiment, since the connection mechanism 30 which includes the guide arms 181, 181 extending along the forward and backward direction below the wind screen 51 and rocks the guide arms 181, 181 upwardly and downwardly in response to movement of the movable element fixing side stays 97 connected to the wind screen 51 to vary the inclination angle of the sub screen 20 by the upward and downward movement of the guide arms 181, 181 is configured, various parts which compose the connection mechanism 30 can be disposed below the sub screen 20.

Accordingly, in addition to effects similar to those of the first and second embodiments, since there is no necessity to dispose the sub screen connecting stay 31 and so forth above the sub screen 20, parts of the type described do not disturb the flow of the air from between the upper cowling 41 and the wind screen 51, and the air flow can flow more smoothly along the front face of the sub screen 20. Thus, a reduction of the air resistance and a reduction of wind noise can be achieved.

Further, in the connection mechanism 30 of the present configuration, the left and right guide arms 181, 181 are connected to the sub screen 20 through the arms 193, 193 thereby to configure a link mechanism for appropriately tilting the sub screen 20 in response to upward or downward movement of the guide arms 181, 181. In other words, by adjusting the mounting position and the arm length of the guide arms 181, 181, the relationship between the inclination angle of the wind screen 51 and the inclination angle of the sub screen 20 can be adjusted, and also a change of design is easy.

While the present invention is described above based on the embodiments, the present invention is not limited to them, but various changes of design can be carried out. For example, while, in the embodiments described above, the sub screen 20 is mounted for rocking motion on the upper cowling 41 through the visor 25, the mounting is not limited to this, but the sub screen 20 may be mounted for rocking motion directly on the upper cowling 41. In this instance, the sub screen 20 may be formed as part of the upper cowling 41.

Further, since the sub screen 20 is smaller in size than the wind screen 51 and besides is supported for rocking motion on the upper cowling 41, even if the sub screen 20 is formed from a non-transparent material, the visual observability of the driver can be assured sufficiently, and the degree of freedom in design of the sub screen 20 can be assured sufficiently.

Further, while, in the embodiments described above, the present invention is applied to a screen for a motorcycle wherein the wind screen 51 is driven by an electric motor, any other driving source than the electric motor may be used, or the present invention can be applied widely to a manual screen wherein the wind screen 51 is operated manually and so forth.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A screen for a motorcycle including a cowling for covering a front upper portion of a vehicle body and a movable wind screen disposed in an inclined relationship toward the rear direction of said vehicle body above said cowling and mounted such that the inclination angle thereof can be adjusted, comprising:
    a baffle plate inclined toward the rear direction of said vehicle body, said baffle plate being provided between the cowling and said movable wind screen, and the inclination angle of said baffle plate is adjustable wherein an air flow from between said cowling and said movable wind screen flows along a rear face of said movable wind screen,
    wherein the inclination angle of said baffle plate is set to a large angle when the inclination angle of said movable wind screen is large, but when the inclination angle of said movable wind screen is small, the inclination angle of said baffle plate is set to a small angle.

2. The screen for a motorcycle according to claim 1, wherein said baffle plate is connected to said movable wind screen, and a connection mechanism for varying the inclination angle of said baffle plate in response to the inclination angle of said movable wind screen is provided.

3. The screen for a motorcycle according to claim 1, wherein said baffle plate is connected for sliding movement to said cowling while a state wherein a lower end thereof is positioned in the proximity of the surface of said cowling is kept so that the air flow flowing along the surface of said cowling permits flow toward the rear direction of said vehicle body along a front face of said baffle plate.

4. The screen for a motorcycle according to claim 2, wherein said baffle plate is connected for sliding movement to said cowling while a state wherein a lower end thereof is positioned in the proximity of the surface of said cowling is kept so that the air flow flowing along the surface of said cowling permits flow toward the rear direction of said vehicle body along a front face of said baffle plate.

5. The screen for a motorcycle according to claim 2, wherein the connection mechanism includes a pair of left and right sub screen holders secured to the wind screen with boss portions projecting from an inner face thereof of movable element fixing side stays and holders fitted to the boss portions and secured thereto for pivotally motion relative thereto.

6. The screen for a motorcycle according to claim 2, wherein the connection mechanism includes left and right guide arms mounted at proximal ends for pivotal motion and extending rearwardly with distal ends being connected to left and right projections formed on the baffle plate for enabling an inclination angle of the baffle plate.

7. A screen for a vehicle including a cowling for covering a front upper portion of a vehicle body comprising:
    a movable wind screen operatively positioned to be at an inclined relationship toward the rear direction of said vehicle body above said cowling;
    adjustable mounting means for selectively mounting the movable wind screen at predetermined inclination angles relative to the cowling;
    a baffle plate operatively positioned to be inclined toward the rear direction of said vehicle body, said baffle plate being provided between the cowling and said movable wind screen; and
    an inclination angle of said baffle plate being adjustable wherein an air flow from between said cowling and said movable wind screen flows along a rear face of said movable wind screen,
    wherein the inclination angle of said baffle plate is set to a large angle when the inclination angle of said movable wind screen is large, but when the inclination angle of said movable wind screen is small, the inclination angle of said baffle plate is set to a small angle.

8. The screen for a vehicle according to claim 7, wherein said baffle plate is connected to said movable wind screen, and a connection mechanism for varying the inclination angle of said baffle plate in response to the inclination angle of said movable wind screen is provided.

9. The screen for a vehicle according to claim 7, wherein said baffle plate is connected for sliding movement to said cowling while a state wherein a lower end thereof is positioned in the proximity of the surface of said cowling is kept so that the air flow flowing along the surface of said cowling permits flow toward the rear direction of said vehicle body along a front face of said baffle plate.

10. The screen for a vehicle according to claim 8, wherein said baffle plate is connected for sliding movement to said cowling while a state wherein a lower end thereof is positioned in the proximity of the surface of said cowling is kept so that the air flow flowing along the surface of said cowling permits flow toward the rear direction of said vehicle body along a front face of said baffle plate.

11. The screen for a vehicle according to claim 8, wherein the connection mechanism includes a pair of left and right sub screen holders secured to the wind screen with boss portions projecting from an inner face thereof of movable element fixing side stays and holders fitted to the boss portions and secured thereto for pivotally motion relative thereto.

12. The screen for a vehicle according to claim 8, wherein the connection mechanism includes left and right guide arms mounted at proximal ends for pivotal motion and extending rearwardly with distal ends being connected to left and right projections formed on the baffle plate for enabling an inclination angle of the baffle plate.

* * * * *